Oct. 20, 1942.    L. W. EGGLESTON    2,299,473
VALVE
Filed May 15, 1940
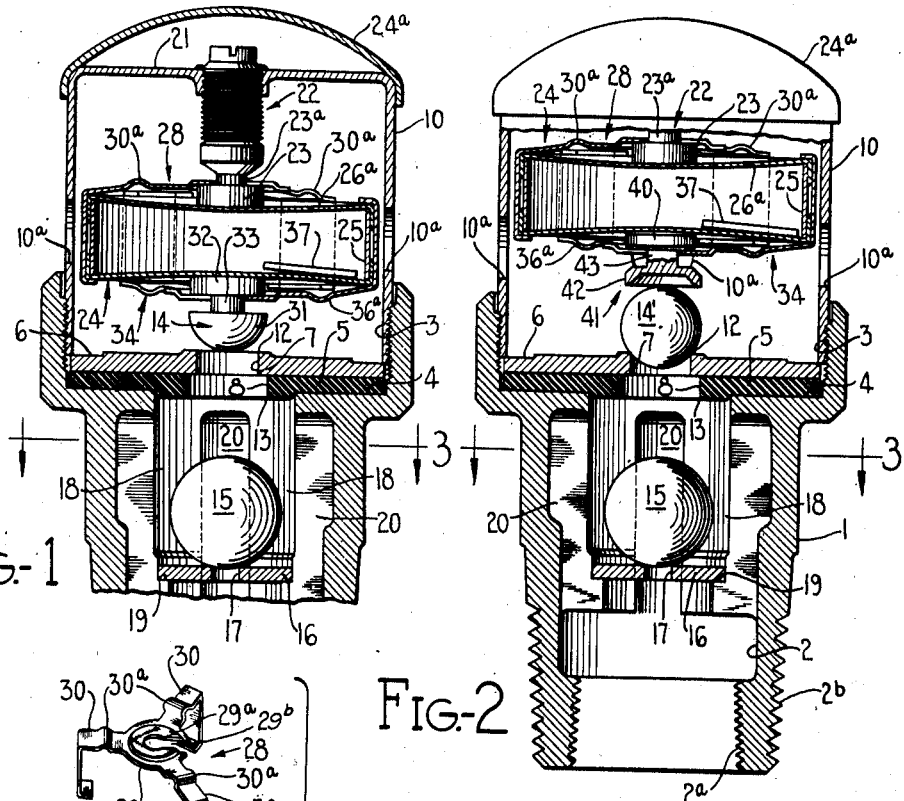
Fig.-1
Fig.-2
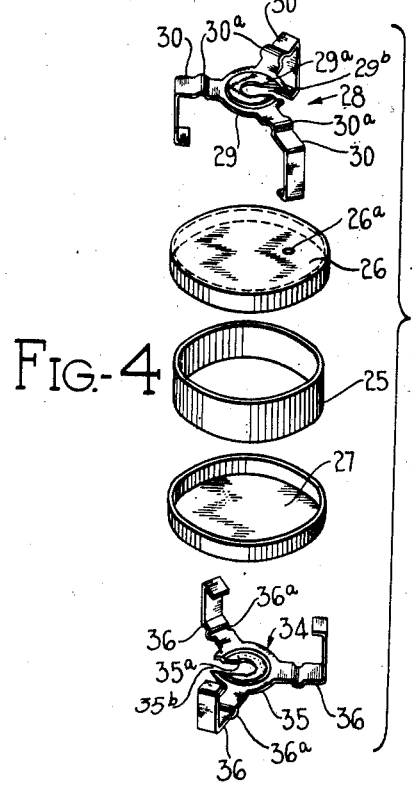
Fig.-4
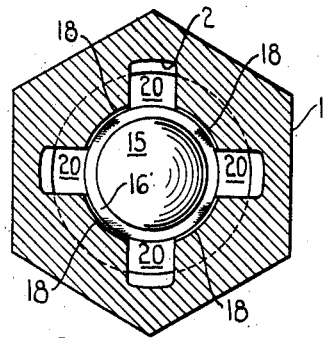
Fig.-3
INVENTOR
Lewis W. Eggleston
BY
Andrew K. Foulds
his attorney Patented Oct. 20, 1942

2,299,473

UNITED STATES PATENT OFFICE 2,299,473

VALVE

Lewis W. Eggleston, Davison, Mich., assignor to Detroit Lubricator Company, Detroit, Mich., a corporation of Michigan Application May 15, 1940, Serial No. 335,258

7 Claims. (Cl. 236—62)

This invention relates generally to valves and more particularly to vent valves.

It is one of the objects of this invention to provide a new and improved vent valve structure which, among other uses, is particularly suited for venting air from heat conveying conduits and which prevents the escape of the heating medium.

Another object is to provide a new and novel pressure sensitive power element.

Another object is to provide a new and novel means for securing the operated means to the power element.

The invention consists of the improved construction and combination of parts to be more fully described hereinafter and the novelty of which will be particularly pointed out and distinctly claimed.

In the accompanying drawing, to be taken as a part of this specification, I have fully and clearly illustrated this invention, in which drawing:

Figure 1 is a view in cross-section taken longitudinally through the improved vent valve;

Fig. 2 is a view of a modified form of the vent valve;

Fig. 3 is a view shown in cross-section taken along the line 3—3 of Figs. 1 or 2, and Fig. 4 is an exploded view of the thermostatic power element employed in the valve structure.

Referring to the drawing by characters of reference, the vent valve structure includes a housing or casing, sectional in construction and including a body 1 which is preferably tubular in shape. The body 1 has a central longitudinal passageway therethrough and the lower end of the body 1 constitutes the inlet end and is preferably externally and/or internally threaded for connection in the line of a heating system. The inner wall of the body 1, and which defines the passageway therethrough, is preferably circular in contour or cross-section and is formed by a number of different sized concentric bores including a bore 2 which leads into the body 1 from the heating system line. The lower end portion of the bore 2 is internally threaded as at 2ᵃ and externally threaded as at 2ᵇ. The upper end of the body 1 has a bore 3 of relatively larger diameter which leads out of the upper end thereof and provides an upwardly facing annular shoulder or seating surface 4. Mounted on the seating surface 4 there is a valve seat member which includes, in this instance, an annular flexible ring member 5 of rubber or like material having its outer circumferential border portion seating on the shoulder 4. An annular metallic ring member 6 is positioned against the upper face of the member 5 with its central aperture 7 aligned with the central aperture 8 of the member 5. The apertures 7 and 8 are preferably circular in shape and constitute the ports through which the air passes and which are closed to the passage of the heating medium, and of water or other fluid than air. The members 5 and 6 constitute the valve seats and the metallic member 6 acts to reenforce the flexible member 5 so that upon closure of its port 8 the member 5 is prevented from unduly flexing. This particular construction allows for the use of an extremely flexible material for the member 5 and still due to the reenforcing effect of the member 6 it cannot be easily ruptured or unduly flexed due to a temporary pressure increase in passageway 2. The valve member, as will be hereinafter set forth, which cooperates with the seat member 5 is urged by buoyancy into engagement therewith and extreme flexibility to prevent leakage is desirable.

Mounted on the upper end of the body 1 there is a casing or cap 10 which is preferably a shell-like cap of tubular form having a plurality of apertures 10ᵃ through its side wall for venting its interior to atmosphere. The inner wall of the enlarged diameter portion 3 of the body 1 may be threaded, and the cap 10 may be externally threaded for screw-threading thereinto. If desired, the cap 10 may also be employed to clamp the valve seat structure tightly against its seating shoulder 4 by threading the cap 10 into the body 1 so that its inner end engages a circumferential border portion of the member 6, as shown, or the valve seat structure may be held in any other suitable manner.

The valve seat structure divides the interior of the sectionally constructed casing into two chambers, communicable through its ports 7 and 8, comprising the inlet chamber or passageway in the body 1 and an outlet chamber within the cap 10. The ring member 6 has a valve seat 12 at its top wall surrounding the port 7 and the ring member 5 has a valve seat 13 on its underside surrounding the port 8, the valve seats 12 and 13 being adapted for cooperating with valve members 14 and 15, respectively, for controlling flow through the ports 7 and 8. The ball valve member 15 is preferably loosely disposed in the body 1 and is supported normally on a plate member 16 which may be in the form of an annular plate-like member as shown with a central aperture 17 therethrough to provide a seat for the ball.

The inner wall of the bore 2 has a plurality of inwardly facing ribs or projections 18 which have at their lower end portions, shoulders 19, against which the plate member 16 is positioned. The inner edge portions of the ribs 18 serve as guides to maintain the ball valve member 15 within predetermined limits and the spaces between the ribs 18 serve as by-pass passageways 20 around the valve member 15 for flow of air. The plate member 16 is preferably located so as to support the ball valve member 15 in spaced relation to its seat 13 and which is the normal position of the ball. The plate member 16 may be press fitted to the inner surfaces of the ribs 18 or otherwise suitably secured against the shoulders 19. Preferably the aperture 17 in the plate 16 is only sufficiently large to cause a small portion of the ball member 15 to rest thereon so that only a small portion of the ball member 15 projects below the plate to eliminate any danger of the ball sticking to its supporting seat. Also the diameter of the inner space bounded by the ribs 18 is preferably only slightly larger than the diameter of the ball in order to prevent the ball from coming to rest in any other position except on its seat.

The ball valve 15 is constructed of a relatively light weight material, such as aluminum, and is constructed hollow, as is shown in my Patent No. 2,146,696 granted February 7, 1939, and has a lower specific gravity than water so that it will float, the purpose of which is hereafter described. Air entering the body will pass through the openings or passageways 20 and the ball member 15 remains in its position against the plate member 16.

In the top wall 21 of the cap 10, there is a threaded aperture in which is screw-threaded an adjustable supporting post or means 22 which may be an externally screw-threaded member having a head portion 23 which is spaced from the threaded portion by a neck 23$^a$ and which carries a thermostatic member 24. Subsequent to adjustment, the means 22 is held in position as by a portion of solder at the screw-threaded connection. After assembly and adjustment of the means 22, the means 22 and the top wall 21 are covered by a cover member 24$^a$ which has its peripheral edge portions press fitted over the vertical side walls of the cap 10. The thermostatic member 24 comprises a tubular portion of circular cross-section 25 having its end portions closed and sealed in fluid-tight relation by a pair of thin flexible diaphragm-like upper and lower end members 26, 27. The upper member 26 has a small aperture 26$^a$ therethrough for admitting the temperature sensitive fluid to the interior of the member 24 and which aperture 26$^a$ is sealed as by a drop of solder subsequent to the introduction of the fluid as will be described more in detail hereinafter.

The thermostatic member 24 is secured to the adjustable means 22 by a clip member 28. The member 28 comprises a central annular portion 29 having a plurality of fingers or gripping members 30 which extend radially outward from the central portion 29 to the peripheral edge of the upper end member 26 where they are bent downward along the side wall of the tubular portion 25. The extreme end portions are bent inwardly and grip the face of the lower end member 27 thereby to secure the clip member 28 to the thermostatic member 24. The radially extending fingers 30 are fabricated of thin flexible material having just sufficient resiliency to maintain the annular portion 29 in fixed spaced relationship to the end member 26 and yet not materially affect the normal flexing movement of the end member 26 due to change in pressure within the interior of the member 24. To secure added flexibility of the fingers 30, they are embossed as at 30$^a$. The annular portion 29 has a slot 29$^b$ extending through an edge portion thereof so that the portion 29 may be slipped into place over the head portion 23 of the means 22, as shown, with the lower surface of portion 23 positioned against the upper surface of the end member 26. The annular portion 29 also has an embossed or recessed portion 29$^a$ which is of substantially larger diameter than the head portion 23 and which is received therein and which acts as a seating surface therefor.

The valve member 14 has a downwardly extending hemispherical portion 31 which cooperates with the seat 12 and has a head portion 32 connected, by means of a neck 33 of reduced diameter, to the hemispherical portion 31. The head portion 32 is held against the outer surface of the lower member 27 by a clip member 34 similar in all respects to the clip member 28 and which like the member 28 has a central annular portion 35, a recessed portion 35$^a$ and a plurality of flexible fingers or gripping members 36 embossed as at 36$^a$. The neck 33 is slipped through the slot 35$^b$ in the portion 35 so that the head portion 32 is within the recess 35$^a$ with the members positioned as shown. By this clip construction, the efficiency of the thermostatic member 24 is greatly increased due to the increased resiliency of the end members 26 and 27 because the end members are not reenforced by a rigid connection with head portions 23 and 32. The increase in flexibility by utilizing this construction amounts to as much as 25%. The amount of movement of the diaphragm is also greatly increased so that with a given sized diaphragm the valve member 14 may be moved to a further open position with less flow restriction than would otherwise be possible. By selecting the sizes of the necks 23$^a$ and 33 and head portions 23 and 32 so that they are smaller than the holes in the annular portions 29 and 35 and diameters of the recessed portions 29$^a$ and 35$^a$ respectively, it is possible for the member 24 to move relative to the means 22 and for the valve member 14 to move relative to the member 24 so that the members can readily align themselves for proper closure of the seat 12 without maintaining manufacturing tolerances unduly small with a consequent high cost of manufacture. The central annular portions 29 and 35 are urged by the resilient arms 30 and 36 respectively, toward the diaphragms 26 and 27 respectively, and the recessed portions 29$^a$ and 35$^a$ thereof cooperate with the diaphragms 26 and 27 to hold the head portions 23 and 32 for limited relative movement and to prevent the means 22 and member 14 from accidently passing through the respective slotted edge portion 29$^b$ and the slot 35$^b$. Furthermore, by not riveting or welding the members directly to the diaphragm, a source of trouble due to leakage therethrough is eliminated. In quantity manufacture this amounts to a considerable saving in manufacturing costs and also in service costs.

One method which might be used in charging the thermostatic member 24 is first to place it in a water bath of a temperature of, for example, 150° F. and keep the member 24 there until it and any air contained therein has become completely warmed to 150° F. The member 24 is then removed and submerged in a solution of distilled water and denatured alcohol which is maintained at a temperature of, for example, 100° F. As the member 24 cools to the 100° F. temperature, it will draw a quantity of the alcohol solution into its interior through the aperture 26ᵃ in the member 26. The aperture 26ᵃ is then closed by solder while the member 24 is at 100° F. The admitted solution will be absorbed by a piece of blotting paper 37 which was placed within the member 24 at the time the thermostatic member was assembled and which blotting paper helps to prevent evaporation of the alcohol should there be a lapse of time between the filling of the member 24 and the sealing of it by solder.

In Fig. 2 there is shown a modified form of the valve structure in which the valve member 14 is replaced by a ball valve member 14' which seats by its own weight on port 7 and which is sufficiently light so that the venting air or other gasses can lift it from its seat and pass therethrough. The valve member 14' is operatively connected with the thermostatic member 24 by the lower clip member 34 which holds a head portion 40 of a valve means or member 41 against the lower end member 27. A recessed abutting portion 42 is separated from the head portion 40 by a neck 43 and is positioned with the recess facing downward and adapted upon expansion of the member 24 to engage and to hold the valve member 14' against its seat 12 to prevent flow of steam therethrough.

The operation of the air vent valve in connection with a heating system is as follows: The vent valve is particularly suitable for location in the return line from the heat radiating units because of its large capacity for the egress of air, but may be located at any other point desired in the line. It will be understood that although, in the following description of its operation, the air vent valve is described in connection with a heating system employing steam, it may be employed in systems using other heat conveying mediums. When the temperature of the heat conveying medium adjacent the valve body 1 decreases, the fluid pressure of the volatile fluid in the member 24 decreases and permits the atmospheric pressure, within the interior of the cap 10 adjacent the end members 26 and 27, to move the end members to an inwardly bowed position, as shown, thereby opening the valve member 14 or removing the seating force of the ball member 14'. When the pressure of the steam is again raised, any air which may be in the line will be forced therethrough ahead of the steam and because of the large capacity of the valve and small restriction thereof to fluid flow, the air will flow relatively unrestricted to the vent valve. The air enters the passageway 2 of the valve and flows through the passageways 20 around the plate member 16. In the valve of Fig. 1 there is an unrestricted flow passageway through ports 7 and 8 and apertures 10ᵃ to atmosphere and in Fig. 2 the air acts on the exposed surface of the ball member 14' and by reason of its slight pressure above atmosphere, lifts the ball member 14' off its seat so that the air escapes into cap 10 from whence it flows to atmosphere through the apertures 10ᵃ.

If there should happen to be water in the line which might be present due to the prior condensation of steam in the line, the water will be forced through the line by the pressure of the steam and will enter the chamber or passageway 2 of the body 1. The ball member 15, having a lower specific gravity than water, will float and rising will seat against its seat 13 and thus close port 8 to prevent the passage of water therethrough. The pressure of the water acting on the surface of the ball member 15 will press the ball tightly against its seat and because of the resiliency of the member 5 the ball will make a tight connection therewith.

As the heat conveying medium, or steam, begins to heat the fluid within the member 24, the fluid will volatilize and the pressure within member 24 will increase expanding the end members 26 and 27 into an outwardly bowed position thereby causing the valve member 14 to seat tightly against the seat 12, or as in Fig. 2, to cause the member 41 to engage the ball member 14' and hold it securely against the seat 12. The means 22 was adjusted at the time of manufacture so that when the end members 26 and 27 were in their outwardly bowed positions the valve members 14 or 14' would be securely held against the seat 12 but that when the end members 26, 27 were in their inwardly bowed positions, as shown, the valve 14 would be open or the member 41 removed from the ball member 14'.

When the system cools there is a partial vacuum created in the valve body 1, and since the air in the cap 10 is at atmospheric pressure, the ball member 14', in Fig. 2, is held tightly against its seat by the pressure differential and the air in the cap is prevented from entering the line so that the valve functions as a so-called vacuum type of valve. The structure in Fig. 1 will, upon cooling of the member 24, cause the valve member 14 to be lifted from its seat 12 and allow air flow back into the heating system. In the latter system, which is known as a pressure steam system as contrasted with a vacuum steam system, air is admitted and exhausted each cycle of operation.

It may now be seen that the vent valve disclosed is simple and efficient in operation and economical to build in quantities. It is further evident that the particular construction of the temperature sensitive element whereby no rigid members are securely affixed to the flexible diaphragms is a distinct advance in the art.

What is claimed and desired to be secured by Letters Patent of the United States is:

1. In a device of the character described, a hollow pressure sensitive power element having a flexible end wall adapted to flex upon change in pressure in said element, a carrying member having a recess facing said end wall, said carrying member having an opening therethrough leading from an edge of said carrying member and extending into said recess, an operated member having a portion slidable through said opening and into said recess, said operated member having an end portion positioned in said recess and engageable by said carrying member, and means directly secured to said element for resiliently securing said carrying member to and holding said end portion against said end wall so that said operated member is held against said end wall and is blocked throughout the movement of said end wall by the side wall of said recess from slidable movement out of said opening.

2. A device of the character described comprising, a tubular pressure sensitive power element having a disk shaped flexible end wall, a carrying member having a plate-like portion with a recessed portion opening toward said flexible end wall, said plate-like portion being substantially circular and of a less diameter than said flexible end wall and having radially extending flexible fingers directly secured to said element for securing said plate-like portion adjacent said flexible end wall, said plate-like portion having an aperture therethrough concentric with said recessed portion and having a slot leading from an edge of said plate-like portion to said aperture, and an operated member adapted to slide through said slot and into said aperture and having a portion received within said recessed portion and held thereby against said flexible end wall, said fingers having sufficient resiliency to cause said plate-like portion to be urged toward said flexible end wall without having sufficient rigidity to appreciably prevent free flexing of said end wall, said recessed portion cooperating with said operated member portion due to said urging resiliency to hold said operated member against accidental movement out through said slot and to hold said operated member tightly against said end wall irrespective of movement of said end wall.

3. A device of the character described comprising, a tubular pressure sensitive power element having an end wall adapted to flex upon change in pressure in said element, a carrying member having a plate-like portion with a recessed portion opening toward said end wall and having extending flexible fingers secured to said element for resiliently securing said plate-like portion adjacent said end wall, said plate-like portion having an aperture therethrough concentric with said recessed portion and having a slot leading from an edge of said plate-like portion to said aperture, an operating member having a plate-like head portion and a reduced diameter neck portion, said neck portion being slidable through said slot and into said aperture, said head portion being received within said recessed portion and held thereby due to the flexibility of said fingers against said end wall, said recessed portion cooperating with said head portion to hold said neck portion against accidental movement out of said recessed portion and to hold said head portion against said end wall irrespective of flexure of said end wall.

4. A device of the character described comprising, a tubular pressure sensitive power element having an end wall adapted to flex upon change in pressure in said element, a carrying member having a plate-like portion with a recessed portion opening toward said end wall and having extending flexible fingers secured to said element for securing said plate-like portion adjacent said end wall, said plate-like portion having an aperture therethrough concentric with said recessed portion and having a slot leading from an edge of said plate-like portion to said aperture, an operating member having a plate-like head portion and a reduced diameter neck portion, said neck portion being slidable through said slot and into said aperture, said head portion being received within said recessed portion and held thereby due to the flexibility of said fingers against said end wall, said recessed portion being larger than said head portion so that said head portion can have limited movement parallel to said end wall and cooperating with said head portion to hold said neck portion against accidental movement through said slot and to hold said head portion against said end wall irrespective of flexure of said end wall.

5. In an air vent valve, a hollow presure actuated power element having a flexible end wall flexed by change of pressure in said element, a carrying member cooperable with said end wall and having a recess facing said end wall, resilient means operable to flex with said end wall and securing said carrying member to said element and operable to urge said carrying member toward said end wall, said carrying member having an edge opening leading into said recess, a control member projecting from said end wall and through said opening, and a head on said control member positioned in said recess and clamped between said carrying member and said end wall by said resilient means, said control member being movable into cooperable relation with said end wall by movement into said recess through said edge opening upon flexing of said resilient means away from said end wall.

6. An air vent valve comprising a casing having a partition therein with a vent port therethrough and having a cylindrical cap member with an end wall overlying said port, a supporting post concentric with said port and extending from said end wall toward said partition, a head on the inner end of said post, a hollow cylindrical power element having end walls, at least one of said element end walls being flexible, a clip member seated on said head and having an aperture therethrough receiving said post, said clip member having resilient fingers urging said head against one of said element end walls, said fingers having extensions bent over the other of said element end walls to hold said clip member tightly to said power element, and a valve means alined with said port and projecting from said other end wall.

7. An air vent valve comprising a casing having a partition therein with a vent port therethrough and having a cylindrical cap member with an end wall overlying said port, a supporting post concentric with said port and extending from said end wall toward said partition, a head on the inner end of said post, a hollow cylindrical power element having end walls at least one of said element end walls being flexible, a clip member seated on said head and having an aperture therethrough receiving said post, said clip member having resilient fingers urging said head against one of said element end walls, said fingers each having a rebent portion to increase its flexibility and having an extension bent over the other of said element end walls to hold said clip member tightly to said power element, a valve means alined with said port and projecting from said other end wall and a resilient clip member carried by said power element and resiliently holding said valve means to said other element end wall.

LEWIS W. EGGLESTON.